(12) United States Patent
Muraoka et al.

(10) Patent No.: US 11,088,406 B2
(45) Date of Patent: Aug. 10, 2021

(54) METHOD FOR RECOVERING VALUABLE MATERIAL FROM USED LITHIUM-ION BATTERY

(71) Applicant: MITSUBISHI MATERIALS CORPORATION, Tokyo (JP)

(72) Inventors: Shu Muraoka, Iwaki (JP); Hiroshi Hayashi, Iwaki (JP); Hiromichi Koizumi, Iwaki (JP); Ryutaro Fujisawa, Tokyo (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 107 days.

(21) Appl. No.: 16/479,324

(22) PCT Filed: Jan. 23, 2018

(86) PCT No.: PCT/JP2018/001968
§ 371 (c)(1),
(2) Date: Jul. 19, 2019

(87) PCT Pub. No.: WO2018/139445
PCT Pub. Date: Aug. 2, 2018

(65) Prior Publication Data
US 2019/0386354 A1  Dec. 19, 2019

(30) Foreign Application Priority Data
Jan. 24, 2017  (JP) .............................. JP2017-010563

(51) Int. Cl.
*H01M 10/54*  (2006.01)
*H01M 4/36*  (2006.01)
(52) U.S. Cl.
CPC ........... *H01M 10/54* (2013.01); *H01M 4/366* (2013.01)

(58) Field of Classification Search
CPC .............................. H01M 10/54; H01M 4/366
See application file for complete search history.

(56) References Cited

U.S. PATENT DOCUMENTS

| | | | | |
|---|---|---|---|---|
| 5,377,920 A | * | 1/1995 | Alavi | ...................... B03B 9/061 241/17 |
| 6,514,311 B1 | | 2/2003 | Lin et al. | |

(Continued)

FOREIGN PATENT DOCUMENTS

| | | |
|---|---|---|
| JP | 10-074539 A | 3/1998 |
| JP | 11-097076 A | 4/1999 |

(Continued)

OTHER PUBLICATIONS

International Search Report dated Mar. 20, 2018, issued for PCT/JP2018/001968 and English translation thereof.

(Continued)

*Primary Examiner* — Olatunji A Godo
(74) *Attorney, Agent, or Firm* — Locke Lord LLP; James E. Armstrong, IV; Nicholas J. DiCeglie, Jr.

(57) ABSTRACT

A valuable material recovery method includes a discharge step of discharging a lithium-ion battery; a thermal decomposition step of reducing a lithium compound, which is a cathode active material, into a magnetic oxide by thermally treating the lithium-ion battery after being discharged; a crushing step of crushing the lithium-ion battery, after being thermally decomposed, into fragments of a size suitable for wind sorting, allowing part of the magnetic oxide to remain in the aluminum foil; a sieving step of sieving a crushed material to separate the crushed material into an oversized product and an undersized product; a wind sorting step of separating the oversized product into a heavy product and a light product; and a magnetic sorting step of sorting and recovering the aluminum foil with a residue of the magnetic (Continued)

oxide, as a magnetized material, and recovering the copper foil as a non-magnetized material from the light product.

15 Claims, 1 Drawing Sheet

(56) References Cited

U.S. PATENT DOCUMENTS

| | | | |
|---|---|---|---|
| 2002/0124691 A1* | 9/2002 | Tateiwa | C22B 7/007 75/714 |
| 2014/0017621 A1* | 1/2014 | Iida | C22B 1/005 432/13 |

FOREIGN PATENT DOCUMENTS

| | | | |
|---|---|---|---|
| JP | H11-242967 A | | 9/1999 |
| JP | 3079287 B2 | | 8/2000 |
| JP | 2013004299 | * | 1/2013 |
| JP | 2015-219948 A | | 12/2015 |
| JP | 2015219948 A | * | 12/2015 |

OTHER PUBLICATIONS

Supplementary European Search Report dated Oct. 5, 2020, issued for European Patent Applicatio No. 18745259.4.

* cited by examiner

METHOD FOR RECOVERING VALUABLE MATERIAL FROM USED LITHIUM-ION BATTERY

TECHNICAL FIELD

The present invention relates to a method for recovering valuable materials from a used lithium-ion battery. Particularly, the present invention relates to a recovery method of very accurately separating copper, aluminum, and active material compositions from each other which are contained in a lithium-ion battery.

Priority is claimed on Japanese Patent Application No. 2017-010563, filed on Jan. 24, 2017, the content of which is incorporated herein by reference.

BACKGROUND ART

Generally, in a lithium-ion battery, an electrode structure is accommodated in a metallic exterior material, and the electrode structure is formed of an anode, a cathode, a separator, an electrolyte, lead wires, and the like. Aluminum, iron, or the like is used as the material of the exterior material, and the exterior material is formed in a laminate shape, box shape, cylindrical shape, or the like. Each of the anode and the cathode of the electrode structure includes a current collector, an active material, and a binder, and has a structure in which layers of fine powder of the active material are stacked on top of each other and bonded together on the surface of a metallic foil of the current collector. An anode current collector is mainly formed of a copper foil. Graphite is mainly used as an anode active material, and other amorphous carbons, lithium titanate, and the like are also used as the anode active material. A cathode current collector is mainly formed of an aluminum foil. A mixture, obtained by mixing lithium cobaltate ($LiCoO_2$), lithium nickel ($LiNiO_2$), a ternary active material [$Li(Co_aMn_bNi_{1-a-b})O_2$] containing manganese, nickel, and cobalt, and the like at a predetermined mixture ratio, is used as a cathode active material.

Polyvinylidene fluoride (PVDF) is generally used as the binder. The separator is formed of a porous organic film. A substance, obtained by dissolving lithium salt containing fluorine such as lithium hexafluorophosphate ($LiPF_6$) or lithium tetrafluoroborate ($LiBF_4$) in an organic solvent such as carbonates, is mainly used as the electrolyte.

As described above, the lithium-ion battery contains valuable materials such as lithium, cobalt, nickel, aluminum, and copper, and a method for recovering the valuable materials from a used lithium-ion battery is examined.

Patent Document 1 discloses a method for separating aluminum, which is a paramagnetic material, as a magnetized material from copper as a non-magnetized material by applying a high magnetic force of 8,000 gauss or greater to crushed materials that are obtained by crushing a used lithium-ion battery after being heated at a temperature of 300° C. or greater and by sieving the crushed lithium-ion battery. In an example of Patent Document 1, a separation apparatus with a capacity to generate a high magnetism and high gradient magnetic field of 20,000 gauss is used.

In a method for recovering valuable materials from a used lithium battery disclosed in Patent Document 2, a used lithium battery built in an aluminum case is calcinated together with the aluminum case, and calcinated materials are separated into a magnetic material and a non-magnetic material by being crushed and magnetically sorted. The non-magnetic material is repelled from a magnet by applying a magnetic field from the magnet to the non-magnetic material which has generated eddy current so that the non-magnetic material is separated into a crushed powder mainly formed of aluminum and a crushed powder mainly formed of copper. The crushed powder mainly formed of copper is separated into a magnetic material mainly formed of cobalt and a non-magnetic material mainly formed of copper by being magnetically sorted.

CITATION LIST

Patent Literature

[Patent Document 1] Japanese Unexamined Patent Application, First Publication No. 2015-219948

[Patent Document 2] Japanese Patent Publication No. 3079287

SUMMARY OF INVENTION

Technical Problem

In the high-magnetic force sorting described in Patent Document 1 or the method for sorting aluminum and copper using eddy current which is described in Patent Document 2, if the active material is not sufficiently removed from the copper foil or the aluminum foil of the current collector, because there occurs a change in the properties of the copper foil or the aluminum foil for magnetic force or in the apparent specific gravity of the copper foil or the aluminum foil, in many cases, it is difficult to very accurately separate the copper foil and the aluminum foil. Similarly, also when lithium cobalate or lithium nickelate, which is a cathode active material, is changed to cobalt oxide or nickel oxide due to the heat treatment, if cobalt oxide or the like is not sufficiently removed from the aluminum foil of the cathode current collector, it becomes difficult to accurately separate the copper foil and the aluminum foil.

In the magnetic sorting method disclosed in Patent Document 1, a high magnetism and high gradient magnetic field of 8,000 gauss or greater (20,000 gauss in the example) is used to forcibly magnetize aluminum which is not magnetized by a typical magnetic force. For this reason, the magnetic sorting method disclosed in Patent Document 1 puts a large burden on magnetic sorting equipment. In the magnetic sorting method disclosed in Patent Document 2, aluminum is separated from copper due to aluminum or copper being ejected by repulsion between eddy current and the magnetic field of the permanent magnet. However, in the magnetic sorting method disclosed in Patent Document 2, if a large amount of material sticks to aluminum or copper, or if a size or shape is not uniform, an ejection distance varies in a wide range, and thus it is difficult to accurately separate aluminum and copper.

Specific gravity sorting using a difference in specific gravity (copper: 8.8 $g/cm^3$, and aluminum: 2.7 $g/cm^3$) is known as a typical method for sorting the copper foil and the aluminum foil from each other which are contained in the electrode structure. However, even in the specific gravity sorting, if the cathode active material or an oxide thereof is not sufficiently removed from the aluminum foil, the apparent specific gravity of the aluminum foil becomes large, and a difference in apparent specific gravity between the copper foil and the aluminum foil becomes small. For this reason, it becomes difficult to very accurately separate the aluminum foil and the copper foil.

It is easy to delaminate graphite or the like of an anode active material, which sticks to the copper foil of the anode current collector. However, it is more difficult to delaminate lithium cobalate or the like of a cathode active material sticking to the aluminum foil of the cathode current collector, or a thermal decomposition product thereof than to delaminate the anode active material. If a mixture of the aluminum foil, to which a large amount of lithium cobalate or the thermal decomposition product thereof sticks, and the copper foil is sorted using specific gravity, the cathode active material or the aluminum foil, to which an oxide of the cathode active material sticks, is mixed with a heavy product (copper foil concentrate), and it becomes difficult to improve the copper grade of the heavy product. If a physical impact is repeatedly applied to the aluminum foil in order to thoroughly delaminate the cathode active material from the aluminum foil, the aluminum foil becomes fine particles, and a larger amount of aluminum is mixed with the active material. In addition, it is necessary to acquire target materials of uniform size or shape for the specific gravity sorting; however, it is difficult to acquire the copper foil and the aluminum foil which is in a predetermined size or shape range.

A method has been tried in which while taking advantage of the fact that after a lithium-ion battery is discharged, thermally decomposed, and crushed, because cobalt oxide, nickel oxide, metallic nickel, or the like formed by thermal decomposition of lithium cobalate, lithium nickelate, or the like, which are a cathode active material, are a ferromagnetic material, an aluminum foil is separated as a magnetized material from a copper foil in a state where a small amount of the ferromagnetic material sticks to the aluminum foil (Japanese Patent Application No. 2016-56258). The method has the advantage of being capable of accurately separating the aluminum foil from the copper foil using a relatively low magnetic force. If an exterior material is made of aluminum, a crushed material of the exterior material remains as a non-magnetized material, together with the copper foil, thereby causing a decline in the copper grade of a recovered copper material. For this reason, it is desirable to provide a process of further separating the crushed material of the aluminum exterior material in order to improve the copper grade of the recovered copper material.

An object of the present invention is to fundamentally solve the problem that in the magnetic sorting in the related art which is described in Patent Documents 1 and 2, it is difficult to very accurately separate a copper foil and an aluminum foil in a state where a cathode active material or a thermal decomposition product thereof is not sufficiently removed from the aluminum foil of a cathode current collector. The present invention provides a method of improving the copper grade of a recovered copper material by sorting a crushed material of an exterior material using a wind power before magnetically sorting an aluminum foil, which is a method of separating the aluminum foil from a copper foil using a relatively low magnetic force.

Solution to Problem

According to one aspect of the present invention, there is provided a method for recovering a valuable material from a used lithium-ion battery, the method having the following configurations.

[1] A valuable material recovery method for separating and recovering a valuable material from a used lithium-ion battery in which an electrode structure is accommodated in an exterior material, and the electrode structure includes a copper foil and an aluminum foil of current collectors, active material compositions supported by the current collectors, a lead wire, and a metallic material of the exterior material, the method includes (A) a discharge step of discharging the lithium-ion battery; (B) a thermal decomposition step of thermally decomposing and removing a combustible composition contained in the lithium-ion battery, and reducing a lithium compound, which is a cathode active material of the electrode structure, into a magnetic oxide by thermally treating the lithium-ion battery after being discharged; (C) a crushing step of crushing the lithium-ion battery, after being thermally decomposed, into fragments of a size suitable for wind sorting which is a post step, allowing part of the magnetic oxide to remain in the aluminum foil of the current collector, and delaminating a remainder of the magnetic oxide from the aluminum foil; (D) a sieving step of sieving a crushed material, which is obtained in the crushing step, to separate the crushed material into an oversized product and an undersized product, and to recover the magnetic oxide and an anode active material composition of the electrode structure which are contained in the undersized product; (E) a wind sorting step of separating the oversized product into a heavy product and a light product; and (F) a magnetic sorting step of sorting and recovering the aluminum foil with a residue of the magnetic oxide, as a magnetized material, and recovering the copper foil as a non-magnetized material from the light product.

The valuable material recovery method of one aspect of the present invention includes the following aspects.

[2] In the valuable material recovery method described in [1], in the wind sorting step, the light product is separated from the heavy product by sorting, using a wind power with a wind speed of 3 m/s to 12 m/s, the oversized product which contains the heavy product containing a crushed metallic material of the exterior material and a crushed metallic material of the electrode structure, and the light product containing the copper foil and the aluminum foil of the crushed current collectors, and which has a particle size of 5 mm square to 20 mm square.

[3] In the valuable material recovery method described in [1] or [2], in the magnetic sorting step, the aluminum foil with a residue of the magnetic oxide is sorted as the magnetized material, and is separated from the copper foil as the non-magnetized material by sorting the aluminum foil with the magnetic oxide thereon, in which the total amount of cobalt and nickel of the magnetic oxide sticking to the aluminum foil is within a range of 1% by mass to 15% by mass, using a magnetic force with a surface magnetic flux density of 1,000 gauss or greater and less than 8,000 gauss.

[4] The valuable material recovery method described in any one of [1] to [3] further includes a magnetic oxide delaminating step of delaminating and separating the aluminum foil and the magnetic oxide by further crushing the magnetic material after recovering the aluminum foil with a residue of the magnetic oxide as the magnetized material.

[5] The valuable material recovery method described in any one of [1] to [4] further includes a ferrous material separating step of magnetically sorting a ferrous material of the crushed metallic material contained in the heavy product sorted using a wind power.

[6] The valuable material recovery method described in [5] further includes a non-ferrous material sorting step of separating and recovering a crushed aluminum material and a crushed copper material contained in the non-magnetized material from which the ferrous material is separated.

[7] In the valuable material recovery method described in [6], in the non-ferrous material sorting step, the crushed aluminum material and the crushed copper material, which are contained in the non-magnetized material from which the ferrous material is separated, are separated from each other and recovered by color sorting or sieving.

[8] In the valuable material recovery method described in any one of [1] to [7], in the discharge step, the lithium-ion battery is discharged until a single cell battery voltage reaches 0.6 V or less.

[9] In the valuable material recovery method described in any one of [1] to [8], in the thermal decomposition step, the lithium-ion battery is heated in a non-oxidative atmosphere at a temperature of 400° C. to 600° C.

[10] In the valuable material recovery method described in any one of [1] to [9], the crushing step includes a primary crushing step of crushing the exterior material and the electrode structure of the lithium-ion battery, and a secondary crushing step of crushing a primary oversized product, which is obtained by sieving a primary crushed material obtained in the primary crushing step, into fragments of a size suitable for the wind sorting, allowing part of the magnetic oxide to remain in the aluminum foil, and delaminating a remainder of the magnetic oxide from the aluminum foil.

In the valuable material recovery method of one aspect of the present invention, the lithium compound, which is a cathode active material, is reduced into the magnetic oxide by thermally decomposing the lithium-ion battery after being discharged, and in the magnetic sorting step, the aluminum foil with a small amount of residue of the magnetic oxide is separated as a magnetized material from the copper foil as a non-magnetized material. Therefore, it is not necessary to sufficiently remove the magnetic oxide, formed by thermal decomposition of the lithium-ion battery, from the aluminum foil, and it is possible to very accurately separate the aluminum foil with a residue of the magnetic oxide from the copper foil.

It is possible to reliably separate the aluminum foil as a magnetized material by magnetically sorting the aluminum foil with the magnetic oxide thereon, in which the total amount of cobalt and nickel of the magnetic oxide sticking thereto is within a range of 1% by mass to 15% by mass, using a magnetic force with a surface magnetic flux density of 1,000 gauss or greater and less than 8,000 gauss, preferably, a surface magnetic flux density of 5,000 gauss or greater and less than 8,000 gauss. In the magnetic sorting of the present invention, it is possible to accurately separate the aluminum foil and the copper foil using a very low magnetic force compared to the method disclosed in Patent Document 1, which requires a high magnetic force of 8,000 gauss or greater, actually, of 20,000 gauss.

The magnetic oxide delaminating step is provided, and thus the aluminum foil and the magnetic oxide can be separated and recovered from the aluminum foil with the magnetic oxide thereon, which is recovered as a magnetized material in the magnetic sorting step. It is possible to use various mechanical crushing means as means for the magnetic oxide delaminating step. The magnetic oxide is rubbed off from the aluminum foil by such crushing means. Because the magnetic oxide is finer than the aluminum foil, the magnetic oxide can be sieved and recovered. The magnetic oxide delaminating step and the sieving may be performed as necessary.

The lithium compound, which is a cathode active material supported by the aluminum foil of the cathode current collector of the electrode structure, is reduced into the magnetic oxide by the thermal decomposition step, and then part of the magnetic oxide remains in the aluminum foil, and the magnetic oxide is delaminated and recovered by the crushing step. Similar to the magnetic oxide, the anode active material supported by the copper foil of the anode current collector, or a thermal decomposition product thereof (anode active material compositions containing the anode active material and the thermal decomposition product thereof) is delaminated and recovered from the copper foil by the crushing step.

Because the wind sorting step is performed to separate the oversized product (oversized product obtained by sieving a secondary crushed material if the primary crushing and the secondary crushing are performed), obtained by sieving the crushed material, into the heavy product and the light product, the crushed metallic materials of the exterior material and the electrode structure, contained in the heavy product, are efficiently recovered. Because the wind sorting is performed before the magnetic sorting step of the aluminum foil, it is possible to accurately separate the copper foil and the aluminum foil without an agglomerated crushed metallic material being mixed in the magnetic sorting step. In the wind sorting, the oversized product having a particle size of approximately 5 mm square to approximately 20 mm square is preferably sorted using a wind power with a wind speed of 3 m/s to 12 m/s. Thus, it is possible to satisfactorily separate the copper foil and the aluminum foil from the agglomerated crushed metallic material.

Because the ferrous material separating step is provided to magnetically sort the crushed ferrous material contained in the heavy product sorted using a wind power, in the following non-ferrous material sorting step, the crushed aluminum material and the crushed copper material are satisfactorily separated from the non-magnetized material from which the crushed ferrous material is separated. Because the crushed materials contained in the non-magnetized material are an aluminum agglomerate and a copper agglomerate, each of which is a single body, it is possible to use an existing non-ferrous material sorting apparatus for sorting non-ferrous scraps. Specifically, a color sorting apparatus or a sieving apparatus may be used depending on physical properties such as the sizes, the shapes, and the colors of the aluminum agglomerate and the copper agglomerate.

In the discharge step, preferably, the lithium-ion battery is discharged until the battery voltage reaches 0.6 V or less, and thus the lithium-ion battery is over-discharged, and the surface of the anode current collector (copper foil) is electrochemically eluted. Therefore, it is easy to delaminate the anode active material from the anode current collector, and it is possible to easily delaminate the anode active material from the anode current collector.

In the thermal decomposition step, preferably, the lithium-ion battery is thermally decomposed in a non-oxidative atmosphere at a temperature of 400° C. to 600° C., and thus the separator, the electrolyte, and other combustible compositions are decomposed and removed without oxidation of the copper foil and the aluminum foil of the current collectors contained in the electrode structure of the lithium-ion battery. Because the decomposition temperature of PVDF of the binder is approximately 400° C., bonding performance of the active material becomes lost, and it becomes easy to delaminate the active material from the metallic foil. Lithium cobalate or the like, a cathode active material, is reduced into the magnetic oxide.

It is possible to perform the crushing step in two stages, the primary crushing step and the secondary crushing step. The primary crushing step is performed to crush the exterior material and the electrode structure of the lithium-ion battery, and the secondary crushing step is performed to crush the primary oversized product, obtained by sieving the primary crushed material, into fragments of a size suitable for the wind sorting, to allow part of the magnetic oxide to remain in the aluminum foil, and to delaminate a remainder of the magnetic oxide from the aluminum foil. Therefore, each of the exterior material, the copper foil, and the aluminum foil is crushed into an individual single body, and the sorting thereof becomes easy. In each of the crushing steps, the magnetic oxide and the anode active material composition, formed by thermal decomposition, are recovered, and thus it is possible to avoid a large amount of residue of the magnetic oxide, and to prevent a problem such as working environment becoming worse, which is caused by airbone dust derived from the anode active material composition or the magnetic oxide.

Advantageous Effects of Invention

According to the method of the present invention, the aluminum foil is separated as a magnetized material from the copper foil in a state where a small amount of the magnetic oxide, formed in the thermal decomposition step, remains in the aluminum foil. Therefore, it is possible to separate the aluminum foil using a relative low magnetic force, to greatly reduce a burden on the magnetic sorting compared to a separation method using a high magnetic force in the related art, and to easily and accurately separate the aluminum foil and the copper foil, which it is difficult to separate from each other. It is possible to recover the majority of the magnetic oxide and the anode active material composition as fine powder containing a small amount of impurities.

According to the method of the present invention, because the crushed metallic materials (heavy product) of the exterior material and the electrode structure are separated from the light product such as the aluminum foil or the copper foil by the wind sorting before the aluminum foil is magnetically sorted, it is possible to efficiently recover the metallic materials of the exterior material and the electrode structure. Because the crushed metallic materials of the exterior material and the electrode structure are not mixed with the light product such as the aluminum foil or the copper foil, it is possible to reduce a burden on the magnetic sorting of the aluminum foil, and to improve the accuracy of separation in the magnetic sorting. It is possible to simplify the separating step.

Because the crushed metallic materials of the exterior material and the electrode structure are separated by the wind sorting before the aluminum foil is magnetically sorted, the step of separating the copper foil and the aluminum foil is not affected by the material of the exterior material. As a result, the present invention can be applied to lithium-ion batteries made from a variety of materials. In the separation and recovery method of the present invention, the aluminum foil is separated as a magnetized material from the copper foil in a state where a small amount of the magnetic oxide, formed in the thermal decomposition step, remains in the aluminum foil, and thus the separation and recovery method is suitable for a low-cost and high-capacity process.

DESCRIPTION OF EMBODIMENTS

Hereinbelow, a valuable material recovery method of an embodiment of the present invention will be specifically described with reference to the drawings.

In a lithium-ion battery which is a process target of the embodiment, generally, an electrode structure is accommodated in a metallic exterior material, and the electrode structure is formed of an anode, a cathode, a separator, an electrolyte, and the like. A process method of the embodiment is a method for separating and recovering a copper foil for the anode, an aluminum foil for the cathode, and active materials for the cathode and the anode from a used lithium-ion battery. A process method illustrated in FIG. 1 includes a discharge step, a thermal decomposition step, a primary crushing step, a primary sieving step, a secondary crushing step, a secondary sieving step, a wind sorting step, a magnetic sorting step, a magnetic oxide delaminating step, a ferrous material separating step, and a non-ferrous material sorting step for the lithium-ion battery.

[Discharge Step]

In the discharge step, the used lithium-ion battery is discharged. The discharge is capable of preventing explosion or fire induced by a short circuit of the battery in a post step, or an electric shock accident induced by contact with high-voltage electrode members. The lithium-ion battery is preferably discharged until a single cell battery voltage becomes less than or equal to 0.6 V. If the single cell battery voltage is over-discharged to 0.6 V or less, because the surface of the copper foil (current collector) for the anode is electrochemically eluted, it is possible to easily delaminate an anode active material (graphite or the like) from the copper foil. In the discharge step, it is possible to discharge the lithium-ion battery by applying a resistance between electrodes, for example, it is possible to discharge the lithium-ion battery in a short period of time by controlling voltage or current in a state where the lithium-ion battery is connected to an electronic load apparatus. The lithium-ion battery may be soaked in a conductive aqueous solution such as sodium chloride solution for a long period of time such that the lithium-ion battery is naturally discharged.

[Thermal Decomposition Step]

The thermal decomposition step is a step of decomposing and removing combustible compositions, for example, the separator (porous organic film or the like), the electrolyte (organic solvent in which lithium salt is dissolved), and other combustible compositions (resin) by thermally decomposing the discharged lithium-ion battery. The thermal decomposition step is a step of decomposing a lithium compound such as lithium cobaltate, which is a cathode active material of the electrode structure, into a magnetic oxide such as cobalt oxide by reacting the lithium compounds with carbon and the like or hydrogen fluoride which are formed by the decomposition of polyfluorinated vinylide of a binder, the electrolyte or the like. Lithium cobalate, which is a cathode active material, is decomposed into cobalt oxide and lithium fluoride by being reduced in the following equation.

$$4LiCoO_2 + 4HF + C \rightarrow 4CoO + 4LiF + CO_2 + 2H_2O$$

In the thermal decomposition step, the discharged lithium-ion battery is preferably heated in a non-oxidative atmosphere at a temperature of 400° C. to 600° C. If the heating temperature is much lower than 400° C., the binder, the separator, and the electrolyte are not sufficiently decomposed and removed, and it becomes difficult to delaminate the active materials from current collectors. The lithium compound, which is a cathode active material, may not be reduced and be changed to the magnetic oxide. Typically, a reaction to turn lithium cobalate ($LiCoO_2$) or lithium nickelate ($LiNiO_2$), which is a cathode active material, into cobalt oxide (CoO) or nickel oxide (NiO) occurs at a temperature of 400° C. or greater. In thermal decomposition performed at a temperature of less than 400° C., lithium cobalate or lithium nickelate is not reduced into the magnetic oxide such as cobalt oxide or nickel oxide. On the other hand, if the heating temperature is the melting point (660° C.) of aluminum or greater, because it may not possible to separate the aluminum foil which is a cathode current collector due to melting the aluminum foil, the heating is preferably performed at a temperature of 600° C. or less. If the heating is performed in an oxidative atmosphere, an organic substance is burned, but the copper foil or the aluminum foil is oxidized, and the oxidized copper foil or the oxidized aluminum foil loses a value of resource as metal has. The heating temperature is preferably within a range of 500° C. to 600° C., but is not limited thereto.

A thermal decomposition time differs depending on conditions such as the capacity of a heating apparatus, and the shape or size of the lithium-ion battery. Typically, the thermal decomposition time preferably is a period of 10 minutes to 4 hours, more preferably, a period of 20 minutes to 1 hour. It is possible to use a rotary kiln furnace, a fluidized-bed furnace, a tunnel furnace, a muffle furnace, a cupola furnace, a stoker furnace, and the like as the heating apparatus.

[Primary Crushing Step]

In the primary crushing step, the exterior material, the cathode, and the anode of the lithium-ion battery after the thermal decomposition are crushed. Owing to the primary crushing, the anode (copper foil and anode active material) and the cathode (aluminum foil, cobalt oxide, and the like) are exposed from the exterior material, are disassembled by cutting into fragments of a predetermined size, and thus can be sorted. During the crushing, the magnetic oxide and the anode active material composition, which weakly stick to the anode and the cathode, are easily delaminated from the current collectors (aluminum foil and copper foil).

The size of primary crushed materials preferably is, for example, within a range of approximately 10 mm to 50 mm so that a powder of the magnetic oxide or the anode active material composition can be obtained as primary undersized products in the primary sieving step which is a post step. It is possible to use a crushing apparatus such as dual shaft crusher, single shaft crusher, or chain crusher as a crushing apparatus of the primary crushing step.

[Primary Sieving Step]

In the primary sieving step, the primary crushed materials are separated into a primary oversized product and a primary undersized product by sieving, and the magnetic oxide or the anode active material composition, contained in the primary undersized product, is recovered. Because a powder of the magnetic oxide or the anode active material composition, obtainable as the primary crushed material, generally has a particle size of several tens of μm, a sieve used in the primary sieving step preferably has an opening of 0.1 mm to 1.0 mm, more preferably, an opening of 0.2 mm to 0.5 mm. If the opening of the sieve is greater than 1.0 mm, there occurs an increase in the mixing ratio between crushed materials of the copper foil and the aluminum foil, which are the current collectors. On the other hand, if the opening of the sieve is less than 0.1 mm, because a sieving speed becomes slow, and the magnetic oxide or the anode active material composition exists as agglomerates having a size of approximately 0.1 mm, it may not be able to recover the magnetic oxide or the anode active material composition as the undersized product.

[Secondary Crushing Step]

In the secondary crushing step, the primary oversized product is crushed into fragments of a size suitable for wind sorting which is a post step, part of the magnetic oxide is allowed to remain in the aluminum foil, and the remainder of the magnetic oxide is delaminated from the aluminum foil. The size suitable for the wind sorting preferably is within a range of approximately 3 mm square to 30 mm square, more preferably, within a range of 5 mm square to 20 mm square. It is possible to use an impact crusher such as hammer crusher or cutter mill, or a high-speed shear crusher as a crushing apparatus of the secondary crushing step. It is possible to allow part of the magnetic oxide to remain in the aluminum foil, and to delaminate the remainder of the magnetic oxide from the aluminum foil by crushing the primary oversized product.

[Secondary Sieving Step]

In the secondary sieving step, secondary crushed materials are separated into a secondary oversized product and a secondary undersized product by sieving, and the magnetic oxide or the anode active material composition, contained in the secondary undersized product, is recovered. A powder of the magnetic oxide or the anode active material composition, which has not been delaminated in the primary crushing step, is delaminated in the secondary crushing step, and is recovered as an undersized product in the secondary sieving step.

Because the magnetic oxide or the anode active material composition, obtainable as the secondary crushed material, generally has a size of several tens of μm, a sieve used in the secondary sieving step preferably has an opening of 0.1 mm to 1.0 mm, more preferably, an opening of 0.2 mm to 0.5 mm as with the primary sieving. If the opening of the sieve is greater than 1.0 mm, there occurs an increase in the ratio in which crushed materials of the copper foil and the aluminum foil, which are the current collectors, are mixed into the undersized product. On the other hand, if the opening of the sieve is less than 0.1 mm, because a sieving speed becomes slow, and the magnetic oxide or the anode active material composition exists as agglomerates having a size of approximately 0.1 mm, it may not be able to recover the magnetic oxide or the anode active material composition as the undersized product.

Preferably, a sieving step is provided consecutively after each crushing step of the primary crushing step and the secondary crushing step, and thus crushed materials are separated into metallic compositions and active material concentrates by being sieved immediately after being crushed. If sieving is not performed for each crushing step, there occurs an increase in the percentage of re-sticking of the magnetic oxide, delaminated from the cathode current collector (aluminum foil), to the copper foil. When the aluminum foil is magnetically sorted in a post step, the copper foil, to which the magnetic oxide has re-stuck, is magnetized together with the aluminum foil, and there occurs a decline in the accuracy of separation of the copper foil and the aluminum foil, thereby causing a loss in the recovery of copper.

[Wind Sorting Step]

In the wind sorting step, the secondary oversized product is separated into a heavy product and a light product. The heavy product is a secondary oversized product which remains without movement when oversized products having a particle size of approximately 5 mm square to approximately 20 mm square are subjected to a wind power with a wind speed of 3 m/s to 12 m/s. The light product is a secondary oversized product which is moved or blown away when oversized products having a particle size of approximately 5 mm square to approximately 20 mm square are subjected to a wind power with a wind speed of 3 m/s to 12 m/s. The heavy product includes the exterior material and a crushed metallic material (metallic agglomerate) of the electrode structure, and the light product includes the copper foil, and the aluminum foil to which a small amount of the magnetic oxide sticks.

In the secondary sieving step, when the oversized product has a size of approximately 5 mm square to approximately 20 mm square, one copper foil or aluminum fragment of the same size has a weight of approximately 5 to 40 mg, and one exterior material fragment of the same size or one crushed metallic material fragment of the same size of the electrode structure has a weight of 1,000 to 4,000 mg. Both weights differ by approximately 100 times. There is an approximately 100 times difference between both weights. For this reason, the aluminum foil and the copper foil can be satisfactorily separated as light products from heavy products including the exterior material and the crushed metallic material of the electrode structure using a wind power with a wind speed of less than 12 m/s, preferably, a wind speed of 5 to 12 m/s.

In the wind sorting step, if secondary oversized products having a size of approximately 5 mm square to approximately 20 mm square are sorted using a wind power with a wind speed of greater than 12 m/s, because the exterior material and the crushed metallic material of the electrode structure, contained in the oversized products, are moved together with the copper foil or the aluminum foil, it becomes difficult to satisfactorily separate the crushed metallic material from the copper foil and the aluminum foil.

It is possible to efficiently separate and recover the exterior material and the crushed metallic material of the electrode structure from the copper foil or the aluminum foil by the wind sorting. Because the wind sorting is performed before the aluminum foil contained in the light product is magnetically sorted, the crushed metallic material is not mixed with the light product such as the aluminum foil or the copper foil. Therefore, the burden on the magnetic sorting of the aluminum foil is greatly reduced. It is possible to use a recirculating wind sorter, a zigzag sorter, a rotary separator, an air knife, or the like, which is commercially available, as a wind sorting apparatus.

[Magnetic Sorting Step]

In the magnetic sorting step, the aluminum foil, to which a small amount of the magnetic oxide sticks, is separated as a magnetized material from the copper foil which is a non-magnetized material. The aluminum foil, in which the total amount of cobalt and nickel of the magnetic oxide remaining and sticking thereto is within a range of 1% by mass to 15% by mass, preferably, within a range of 1% by mass to 10% by mass, is magnetically sorted using a magnetic force with a surface magnetic flux density of 1,000 gauss or greater and less than 8,000 gauss, preferably, a surface magnetic flux density of 5,000 gauss or greater and less than 8,000 gauss, and thus the aluminum foil is reliably separated as a magnetized material, and is very accurately separated from the copper foil. The total amount of cobalt and nickel of the magnetic oxide remaining and sticking to the aluminum foil can be adjusted within the range by adjusting the number of crushing cycles in each of the primary crushing step and the secondary crushing step. The total amount of cobalt and nickel may be adjusted by adjusting a crushing time and a crushing power depending on the type of a crusher.

The total amount of cobalt and nickel is the ratio (% by mass or wt %) of the mass of (cobalt+nickel) contained in the light product to the mass of (aluminum+cathode active material) contained in the light product before the magnetic sorting step.

If the total amount of cobalt and nickel of the magnetic oxide sticking to the aluminum foil is less than 1% by mass, the stuck amount of the magnetized material is small, and thus the magnetic property is weak, and it is difficult to sufficiently magnetize the aluminum foil using a magnetic force with a surface magnetic flux density of less than 5,000 gauss. A pure aluminum foil, to which the magnetic oxide does not stick at all, is not magnetized even with a surface magnetic flux density of approximately 13,000 gauss. On the other hand, if a magnetic force of greater than 13,000 gauss is used, and the magnetic oxide sticks to the copper foil, the copper foil is magnetized together with the aluminum foil, and there occurs a decline in the accuracy of separation of the aluminum foil and the copper foil.

The aluminum foil, in which the total amount of cobalt and nickel of the magnetic oxide remaining and sticking thereto exceeds 15% by mass, can be sufficiently magnetized using even a magnetic force with a surface magnetic flux density of approximately 5,000 gauss. However, because the aluminum foil is over-magnetized enough to catch the surrounding copper foil, the copper foil is mixed with the aluminum foil as a magnetized material. Therefore, the accuracy of separation declines, a loss in the recovery of copper becomes large, and the grade of recovered aluminum declines. As a result, the total amount of cobalt and nickel remaining in the aluminum foil is preferably less than or equal to 15% by mass.

The total amount of cobalt and nickel of the magnetic oxide sticking to the aluminum foil is required to exceed 15% by mass so that the aluminum foil can be reliably magnetized using a magnetic force with a surface magnetic flux density of less than 5,000 gauss. However, aluminum, recovered from the aluminum foil containing a large total amount of cobalt and nickel, has a low grade.

On the other hand, if a magnetic force with a surface magnetic flux density of 8,000 gauss or greater is used, as described above, because also the copper foil, to which a very small amount of the magnetic oxide sticks, is magnetized, there occurs a decline in the accuracy of separation of the aluminum foil and the copper foil, a loss in the recovery of copper becomes large, and the grade of recovered aluminum declines. A burden on a magnetic sorting apparatus becomes large.

As described above, the aluminum foil with the magnetic oxide thereon, in which the total amount of cobalt and nickel of the magnetic oxide sticking thereto is within a range of 1% by mass to 15% by mass, may be magnetically sorted using a magnetic force with a surface magnetic flux density of 1,000 gauss or greater and less than 8,000 gauss, preferably, a surface magnetic flux density of 5,000 gauss or greater and less than 8,000 gauss.

[Magnetic Oxide Delaminating Step]

In the magnetic oxide delaminating step, the aluminum foil, recovered by the magnetic sorting, is separated from the magnetic oxide sticking thereto by being further crushed. Because the magnetic oxide sticks to the surface of the aluminum foil, it is possible to recover the magnetic oxide by delaminating the magnetic oxide from the aluminum foil by friction crushing using an impact crusher such as hammer crusher, or an air crusher, and by sieving the aluminum foil and the magnetic oxide. The magnetic oxide may be delaminated from the aluminum foil by crushing in water. The magnetized material crushing step and the sieving of crushed materials may be performed as necessary.

[Ferrous Material Separating Step]

In the ferrous material separating step, ferrous materials are magnetically sorted and recovered from the crushed metallic materials contained in the heavy product sorted using a wind power. The heavy product sorted using a wind power includes a steel sheet used in the exterior material, and steel bolts, steel screws, and the like mounted in the exterior material. The steel sheet, the steel bolts, the steel screws, and the like can be magnetically sorted and recovered. The heavy product, from which agglomerated ferrous materials have been separated by the magnetic sorting, contains non-ferrous metals such as crushed aluminum material derived from the exterior material and copper material of electrode lead wires contained in the electrode structure. The non-ferrous metals can be recovered as non-magnetized materials. The ferrous material separating step may be performed as necessary.

Figure 1:
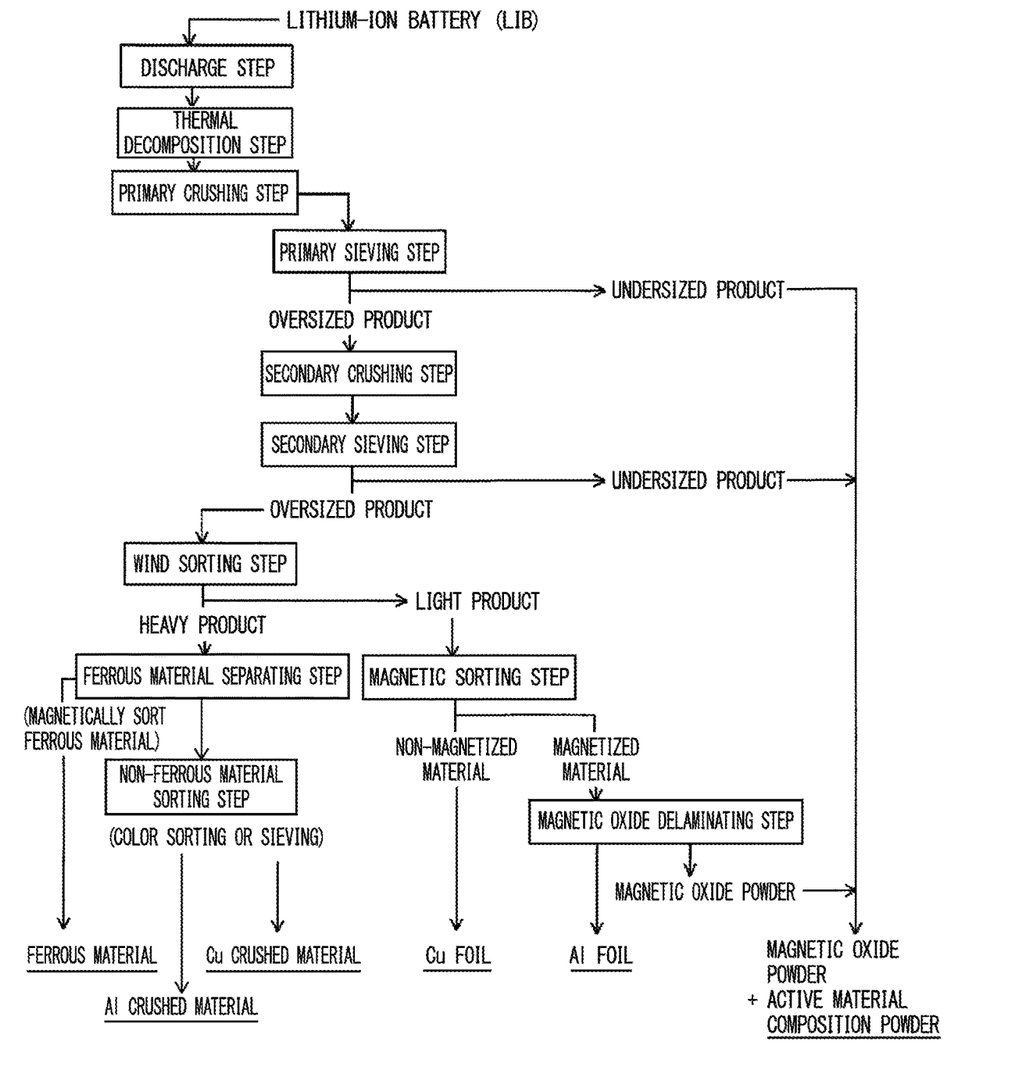
FIG. 1 is a process steps diagram illustrating one example of a valuable material recovery method of an embodiment.

A magnetic force of the ferrous material separating step may be a typical magnetic force to magnetize ferrous materials. Specifically, a magnetic sorting apparatus with a capacity to generate a surface magnetic flux density of 500 gauss or greater and less than 2,000 gauss may be used. If the magnetic flux density is excessively low, it is not possible to sufficiently recover ferrous materials, and there occurs a decline in the grades of non-ferrous metals recovered as non-magnetized materials. On the other hand, if the magnetic flux density is excessively high, magnetization forces of the ferrous materials are excessively strong, and thus it becomes difficult to delaminate the ferrous materials, and a burden on an apparatus becomes large. If taking account of energy efficiency, or the size or the like of a magnetic sorter, it is possible to use a hang-type magnetic sorter, or a lifting magnet type, contact drum type, or pulley type magnetic sorter, with a capacity to generate a surface magnetic flux density of 800 gauss to 1,500 gauss. In FIG. 1, the ferrous material separating step is provided behind the wind sorting step; however, the ferrous material separating step may be provided additionally or alone before the wind sorting step to further improve separability between the heavy product and the light product in the wind sorting step.

[Non-Ferrous Material Sorting Step]

In the non-ferrous material sorting step, the crushed aluminum material, derived from the exterior material and contained in the heavy product from which the agglomerated ferrous materials have been separated, is separated from a crushed copper material used in the electrode lead wires. In the non-ferrous material sorting step, a color sorting apparatus, a grading apparatus, or the like may be used depending on physical properties such as the sizes, the shapes, and the colors of the crushed metallic materials. It is possible to efficiently separate and recover aluminum, derived from the exterior material, and copper material using color sorting based on the fact that copper is a reddish brown color and aluminum is a white-grey color. The non-ferrous material sorting step may be performed as necessary.

EXAMPLES

Hereinbelow, examples of the valuable material recovery method of the present invention will be described. In each example, the amount of cobalt and the amount of nickel of an aluminum foil, to which ferromagnetic particles stick, were quantitatively analyzed by acid dissolution using an ICP emission spectrometer. Copper and aluminum contained in a magnetized material and a non-magnetized material were quantitatively analyzed by acid dissolution using the ICP emission spectrometer.

Example 1

3.32 kg of a used lithium-ion battery (LIB) cell was discharged using an electronic load apparatus until a single cell battery voltage reached 0.6 V or less. The discharged cell was thermally decomposed in a nitrogen atmosphere using a batch type rotary kiln. In the thermal decomposition, a heat-up speed was set to 10° C./min, and the discharged cell was naturally cooled after being held at 500° C. for one hour. The weight of the cell became 2.56 kg, and the weight was reduced by 24%. Thermally decomposed residues was subjected to primary crushing. In the primary crushing, the thermally decomposed residues were crushed twice using a dual shaft crusher. The primary crushed materials were subjected to primary sieving using a sieve having an opening of 0.5 mm, and thus a primary undersized product was recovered. A primary oversized product was subjected to secondary crushing. In the secondary crushing, the primary oversized product was crushed once using a hammer crusher. The secondary crushed materials were subjected to secondary sieving using a sieve having an opening of 0.5 mm, and thus a secondary undersized product was recovered. The total amount of the primary undersized product and the secondary undersized product was 0.86 kg, and almost all of the undersized products were an anode active material composition and a magnetic oxide formed by the thermal decomposition, and a recovery rate for active material compositions containing the magnetic oxide was 90 wt %. 1.60 kg of a secondary oversized product was obtained. The secondary oversized product was subjected to wind sorting using a wind power with a wind speed of 12 m/s, and 1.06 kg of a heavy product containing a crushed metallic material derived from an exterior material, and 0.54 kg of a light product containing a crushed metallic foil material were obtained. The light product was subjected to magnetic sorting. In the magnetic sorting, an aluminum foil, to which the magnetic oxide, formed by the thermal decomposition, sticks, was sorted as a magnetized material using a rare earth separator and a magnetic force with a magnetic flux density of 500 to 15,000 gauss. Table 1 shows the magnetic flux densities of the magnetic sorting, the total amounts of Co and Ni derived from the magnetic oxide sticking to the aluminum foil, and the results of the magnetic sorting. The total amount of Co and Ni was adjusted by adjusting the number of crushing cycles in each of the primary crushing and the secondary crushing.

As shown in Table 1, if the aluminum foil, in which the total amount of Co and Ni of the magnetic oxide sticking thereto is within a range of 1 to 15 wt % is subjected to the magnetic sorting using a magnetic force with a magnetic flux density of 1,000 to 8,000 gauss, because the concentration of aluminum as a magnetized material is high and copper concentration is low, it is possible to perform a very accurate separation (No. 3 to 5, No. 7 to 9, and No. 11 to 16). In the technique disclosed In Patent Document 1, a non-magnetized material with a Cu concentration of 74.9 wt % is obtained by high-magnetic force sorting using an apparatus with a capacity to generate a high magnetism of 20,000 gauss. In the technique disclosed in Patent Document 2, a non-magnetized material with a Cu concentration of 40.7 wt is obtained by sorting using repulsion between eddy current and a magnetic field of a permanent magnet. In the present invention, a non-magnetized material with a high Cu concentration of 86.9 to 90.4 wt % is obtained. The present invention demonstrates a method for recovering non-magnetized materials, which are recovered copper materials, with high copper grades (No. 3 to 5, No. 7 to 9, and No. 11 to 16).

Preferably, aluminum foils containing Co and Ni of a total amount of 1 to 10 wt % may be sorted using a magnetic force with a magnetic flux density of 1,000 to 8,000 gauss, and the aluminum concentrations of magnetized materials are greater than or equal to 48 wt % (No. 3 to 5, No. 7 to 9, and No. 11 to 14).

More preferably, if aluminum foils containing Co and Ni of a total amount of 1 wt % are sorted using a magnetic force with a magnetic flux density of 1,000 to 8,000 gauss, the aluminum concentrations of magnetized materials are greater than or equal to 87 wt %, and the copper concentration is less than or equal to 8.1 wt % (No. 3 to 5).

On the other hand, if the total amount of Co and Ni is 0.5 wt %, a small amount of a magnetized material is obtained even with a magnetic flux density of 5,000 gauss (No. 1). Even when an aluminum foil containing Co and Ni of a total amount of 1 wt % is sorted using a magnetic force with a magnetic flux density of 500 gauss, the amount of a magnetized material is small (No. 2), and it is not possible to sufficiently recover the aluminum foil as a magnetized material in any case.

Even though the total amount of Co and Ni is within a range of 1 to 15 wt %, if a magnetic force with a magnetic flux density of 15,000 gauss is used, a large amount of copper foils are caught onto magnetized materials, and thus the copper concentrations of the magnetized materials become high, and there occurs a decline in the accuracy of separation of copper foils and aluminum foils (No. 6, No. 10, and No. 17).

If the total amount of Co and Ni is 18 wt %, because an aluminum foil is excessively strongly pulled onto a magnet even with a magnetic flux density of 1,000 gauss, a copper foil is caught onto the aluminum foil, the copper concentration of a magnetized material becomes high, and there occurs a decline in the accuracy of separation of the copper foil and the aluminum foil (No. 18).

TABLE 1

| No. | Total Amount of Co and Ni (wt %) | Magnetic Flux Density (gauss) | Magnetized Material | | | | Non-magnetized Material | | | |
| --- | --- | --- | --- | --- | --- | --- | --- | --- | --- | --- |
| | | | Weight (kg) | Al Concentration (wt %) | Cu Concentration (wt %) | Other (wt %) | Weight (kg) | Al Concentration (wt %) | Cu Concentration (wt %) | Other (wt %) |
| 1 | 0.5 | 5000 | 0.03 | 97.8 | 0.0 | 2.2 | 0.51 | 20.5 | 79.2 | 0.3 |
| 2 | 1 | 500 | 0.03 | 95.5 | 0.0 | 4.5 | 0.51 | 19.8 | 79.6 | 0.6 |
| 3 | | 1000 | 0.07 | 92.0 | 3.7 | 4.3 | 0.47 | 14.8 | 87.8 | 0.4 |
| 4 | | 5000 | 0.09 | 91.1 | 4.6 | 4.3 | 0.45 | 11.4 | 88.4 | 0.2 |
| 5 | | 8000 | 0.10 | 87.7 | 8.1 | 4.1 | 0.44 | 10.0 | 89.9 | 0.1 |
| 6 | | 15000 | 0.14 | 65.1 | 31.8 | 3.1 | 0.40 | 10.0 | 89.9 | 0.1 |
| 7 | 6 | 1000 | 0.11 | 69.1 | 5.4 | 25.5 | 0.43 | 11.5 | 86.9 | 1.6 |
| 8 | | 5000 | 0.12 | 68.5 | 6.2 | 25.3 | 0.42 | 9.3 | 90.0 | 0.7 |
| 9 | | 8000 | 0.14 | 62.9 | 13.8 | 23.3 | 0.40 | 9.2 | 90.3 | 0.5 |
| 10 | | 15000 | 0.17 | 52.1 | 28.6 | 19.3 | 0.37 | 9.1 | 90.8 | 0.2 |
| 11 | 8 | 1000 | 0.13 | 59.7 | 6.7 | 33.6 | 0.41 | 10.1 | 88.5 | 1.4 |
| 12 | | 8000 | 0.15 | 55.8 | 12.9 | 31.3 | 0.39 | 9.0 | 90.4 | 0.6 |
| 13 | 10 | 1000 | 0.15 | 50.7 | 7.9 | 41.4 | 0.39 | 9.7 | 88.5 | 1.8 |
| 14 | | 8000 | 0.17 | 48.5 | 11.7 | 39.8 | 0.37 | 8.9 | 90.3 | 0.8 |
| 15 | 15 | 5000 | 0.22 | 30.4 | 6.6 | 63.0 | 0.32 | 8.8 | 88.9 | 2.4 |
| 16 | | 8000 | 0.23 | 30.0 | 7.7 | 62.3 | 0.31 | 8.7 | 89.4 | 1.9 |
| 17 | | 15000 | 0.26 | 26.7 | 18.0 | 55.4 | 0.28 | 9.3 | 89.7 | 1.1 |
| 18 | 18 | 1000 | 0.34 | 16.0 | 16.0 | 68.1 | 0.20 | 9.9 | 88.9 | 1.2 |

Example 2

Similar to Example 1, 3.32 kg of a used lithium-ion battery (LIB) cell was subjected to the primary crushing, the primary sieving, the secondary crushing, and the secondary sieving, and thus 1.60 kg of secondary oversized products were obtained. The secondary oversized products had a particle size of 5 to 20 mm. The secondary oversized product were separated into heavy products and light products by being subjected to the wind sorting using wind speeds of 2 m/s, 3 m/s, 10 m/s, 12 m/s, and 15 m/s. Table 2 shows the results. As shown in Table 2, if the sorting is performed using a wind power with a wind speed of 3 m/s to 12 m/s, the heavy products, containing crushed metallic materials derived from an exterior material and an electrode structure, and the light products, containing aluminum foils and copper foils which are current collectors, can be very accurately separated.

It is not possible to sufficiently blow away metallic foils with a wind speed of 2 m/s, and a large amount of metallic foils remain in the heavy products. On the other hand, if the wind speed is 15 m/s, the crushed metallic materials such as the exterior material are blown away together with the metallic foils, and a large amount of the crushed metallic materials are contained in the light products. As described above, because a wind power with a wind speed of 2 m/s is weak, and a wind power with a wind speed of 15 m/s is strong, separation between the crushed metallic materials and the metallic foils is insufficient in any case.

TABLE 2

|  | Wind Speed (m/s) | 2 | 3 | 10 | 12 | 15 |
|---|---|---|---|---|---|---|
| Heavy Product | Weight kg | 1.47 | 1.20 | 1.06 | 1.01 | 0.69 |
|  | Amount of Crushed Metallic Material (wt %) | 71 | 86 | 96 | 98 | 98 |
|  | Amount of Metallic Foil (wt %) | 29 | 14 | 4 | 2 | 2 |
| Light Product | Weight kg | 0.13 | 0.40 | 0.54 | 0.59 | 0.90 |
|  | Amount of Crushed Metallic Material (wt %) | 0 | 5 | 5.8 | 11 | 41 |
|  | Amount of Metallic Foil (wt %) | 100 | 95 | 94 | 89 | 59 |

(note)
The amount of metallic foil is the total amount of the aluminum foil and the copper foil

Example 3

1.06 kg of the heavy products recovered by the wind sorting in Example 1 were sorted using a magnetic force with a magnetic flux density of 500 gauss, and thus 0.07 kg of ferrous materials contained in the heavy products were separated by the magnetization, and 0.99 kg of non-magnetized materials were recovered. 0.78 kg of a crushed aluminum material (grade 97 wt %) and 0.21 kg of a crushed copper material (grade 84.6 wt %) were recovered from the non-magnetized materials using a color sorting apparatus (manufactured by TOMRA).

Example 4

0.138 kg of the magnetized material (sample No. 9 shown in Table 1) recovered by the magnetic sorting in Example 1 was crushed using a hammer crusher, and thus 0.16 kg of the aluminum foil (recovery rate 17 wt %) and 0.02 kg of the magnetic oxide were recovered. The recovery rate for an active material composition, obtained by combining the recovered magnetic oxide and an active material composition recovered in Example 1, was 92 wt %. The recovery rate is the ratio of a recovery amount to the weight of the battery before being crushed.

INDUSTRIAL APPLICABILITY

The valuable material recovery method of the present invention provides a good accuracy of separation of copper, aluminum, and active material compositions from each other contained in a lithium-ion battery. Particularly, it is possible to separate aluminum foils using a relative low magnetic force, to greatly reduce a burden on magnetic sorting compared to a separation method using a high magnetic force in the related art, and to easily and accurately separate the aluminum foils and copper foils from each other, which it is difficult to separate from each other.

The invention claimed is:

1. A valuable material recovery method for separating and recovering a valuable material from a used lithium-ion battery in which an electrode structure is accommodated in an exterior material, and the electrode structure includes a copper foil and an aluminum foil of current collectors, active material compositions supported by the current collectors, a lead wire, and a metallic material of the exterior material, the method comprising:
   (A) a discharge step of discharging the lithium-ion battery;
   (B) a thermal decomposition step of thermally decomposing and removing a combustible composition contained in the lithium-ion battery, and reducing a lithium compound, which is a cathode active material of the electrode structure, into a magnetic oxide by thermally treating the lithium-ion battery after being discharged;
   (C) a crushing step of crushing the lithium-ion battery, after being thermally decomposed, into fragments of a size suitable for wind sorting which is a post step, allowing part of the magnetic oxide to remain in the aluminum foil of the current collector, and delaminating a remainder of the magnetic oxide from the aluminum foil;
   (D) a sieving step of sieving a crushed material, which is obtained in the crushing step, to separate the crushed material into an oversized product and an undersized product, and to recover the magnetic oxide and an anode active material composition of the electrode structure which are contained in the undersized product;
   (E) a wind sorting step of separating the oversized product into a heavy product and a light product; and
   (F) a magnetic sorting step of sorting and recovering the aluminum foil with a residue of the magnetic oxide, as a magnetized material, and recovering the copper foil as a non-magnetized material from the light product;
   wherein in the wind sorting step, the light product is separated from the heavy product by sorting, using a wind power with a wind speed of 3 m/s to 12 m/s, the oversized product which contains the heavy product containing a crushed metallic material of the exterior material and a crushed metallic material of the electrode structure, and the light product containing the copper foil and the aluminum foil of the crushed current collectors, and which has a particle size of 5 mm square to 20 mm square.

2. The valuable material recovery method according to claim 1,
wherein in the magnetic sorting step, the aluminum foil with a residue of the magnetic oxide is sorted as the magnetized material, and is separated from the copper foil as the non-magnetized material by sorting the aluminum foil with the magnetic oxide thereon, in which the total amount of cobalt and nickel of the magnetic oxide sticking to the aluminum foil is within a range of 1% by mass to 15% by mass, using a magnetic force with a surface magnetic flux density of 1,000 gauss or greater and less than 8,000 gauss.

3. The valuable material recovery method according to claim 1, further comprising:
a magnetic oxide delaminating step of separating and recovering the aluminum foil and the magnetic oxide by further crushing the magnetized material after recovering the aluminum foil with a residue of the magnetic oxide as the magnetized material.

4. The valuable material recovery method according to claim 1, further comprising:
a ferrous material separating step of magnetically sorting a ferrous material of a crushed metallic material contained in the heavy product sorted using a wind power.

5. The valuable material recovery method according to claim 4, further comprising:
a non-ferrous material sorting step of separating and recovering a crushed aluminum material and a crushed copper material contained in the non-magnetized material from which the ferrous material is separated.

6. The valuable material recovery method according to claim 5,
wherein in the non-ferrous material sorting step, the crushed aluminum material and the crushed copper material, which are contained in the non-magnetized material from which the ferrous material is separated, are separated from each other and recovered by color sorting or sieving.

7. The valuable material recovery method according to claim 1,
wherein in the discharge step, the lithium-ion battery is discharged until a single cell battery voltage reaches 0.6 V or less.

8. The valuable material recovery method according to claim 1,
wherein in the thermal decomposition step, the lithium-ion battery is heated in a non-oxidative atmosphere at a temperature of 400° C. to 600° C.

9. The valuable material recovery method according to claim 1,
wherein the crushing step includes a primary crushing step of crushing the exterior material and the electrode structure of the lithium-ion battery, and a secondary crushing step of crushing a primary oversized product, which is obtained by sieving a primary crushed material obtained in the primary crushing step, into fragments of a size suitable for the wind sorting, allowing part of the magnetic oxide to remain in the aluminum foil, and delaminating a remainder of the magnetic oxide from the aluminum foil.

10. The valuable material recovery method according to claim 2, further comprising:
a magnetic oxide delaminating step of separating and recovering the aluminum foil and the magnetic oxide by further crushing the magnetized material after recovering the aluminum foil with a residue of the magnetic oxide as the magnetized material.

11. The valuable material recovery method according to claim 2, further comprising:
a ferrous material separating step of magnetically sorting a ferrous material of a crushed metallic material contained in the heavy product sorted using a wind power.

12. The valuable material recovery method according to claim 3, further comprising:
a ferrous material separating step of magnetically sorting a ferrous material of a crushed metallic material contained in the heavy product sorted using a wind power.

13. The valuable material recovery method according to claim 2,
wherein in the discharge step, the lithium-ion battery is discharged until a single cell battery voltage reaches 0.6 V or less.

14. The valuable material recovery method according to claim 3,
wherein in the discharge step, the lithium-ion battery is discharged until a single cell battery voltage reaches 0.6 V or less.

15. The valuable material recovery method according to claim 4,
wherein in the discharge step, the lithium-ion battery is discharged until a single cell battery voltage reaches 0.6 V or less.

* * * * *